United States Patent
Niegemeier et al.

(10) Patent No.: US 10,519,287 B2
(45) Date of Patent: Dec. 31, 2019

(54) COMPOSITIONS COMPRISING A FIBER MATERIAL AND A THERMOPLASTIC BINDER

(71) Applicant: Henkel AG & Co. KGaA, Duesseldorf (DE)

(72) Inventors: Andreas Niegemeier, Duesseldorf (DE); Andreas Ferencz, Duesseldorf (DE); Tamara Schmidt, Oberhausen (DE); Wolfgang Lupp, Duisburg (DE); Tim Maeling, Troisdorf (DE)

(73) Assignee: Henkel AG & Co. KGaA, Dusseldorf (DE)

( * ) Notice: Subject to any disclaimer, the term of this patent is extended or adjusted under 35 U.S.C. 154(b) by 0 days.

(21) Appl. No.: 16/441,177

(22) Filed: Jun. 14, 2019

(65) Prior Publication Data
US 2019/0292335 A1 Sep. 26, 2019

Related U.S. Application Data

(63) Continuation of application No. PCT/EP2017/081285, filed on Dec. 4, 2017.

(30) Foreign Application Priority Data

Dec. 16, 2016 (EP) ..................... 16204775

(51) Int. Cl.
| | |
|---|---|
| B32B 27/40 | (2006.01) |
| B32B 27/04 | (2006.01) |
| C08L 75/06 | (2006.01) |
| C08G 18/42 | (2006.01) |
| C08J 5/04 | (2006.01) |
| C08G 18/76 | (2006.01) |
| C08G 18/75 | (2006.01) |
| C08G 18/72 | (2006.01) |
| C08G 18/40 | (2006.01) |
| C08G 18/66 | (2006.01) |
| B29C 70/30 | (2006.01) |
| C08G 18/48 | (2006.01) |
| B29K 75/00 | (2006.01) |

(52) U.S. Cl.
CPC ............... *C08J 5/043* (2013.01); *B29C 70/30* (2013.01); *C08G 18/4018* (2013.01); *C08G 18/4216* (2013.01); *C08G 18/4829* (2013.01); *C08G 18/664* (2013.01); *C08G 18/6674* (2013.01); *C08G 18/722* (2013.01); *C08G 18/752* (2013.01); *C08G 18/7657* (2013.01); *C08J 5/042* (2013.01); *B29K 2075/00* (2013.01); *C08J 2375/06* (2013.01)

(58) Field of Classification Search
None
See application file for complete search history.

(56) References Cited

U.S. PATENT DOCUMENTS

| | | | |
|---|---|---|---|
| 4,387,214 A | 6/1983 | Passmore et al. | |
| 9,822,289 B2 | 11/2017 | Roock et al. | |
| 9,896,609 B2 | 2/2018 | Roock et al. | |
| 2004/0171767 A1* | 9/2004 | Pohlmann | C08G 18/0895 525/453 |
| 2008/0146749 A1* | 6/2008 | Pohlmann | C08G 18/0895 525/453 |
| 2008/0248295 A1* | 10/2008 | Hilmer | B29C 45/1657 428/339 |
| 2009/0192262 A1* | 7/2009 | Meltzer | C08G 18/3206 524/590 |
| 2015/0353704 A1 | 12/2015 | Bienmueller et al. | |
| 2017/0233520 A1 | 8/2017 | Poeselt et al. | |

FOREIGN PATENT DOCUMENTS

| | | |
|---|---|---|
| EP | 2803685 A1 | 11/2014 |
| EP | 2803686 A1 | 11/2014 |
| WO | 2015144765 A1 | 10/2015 |
| WO | 2016050531 A1 | 4/2016 |

OTHER PUBLICATIONS

DIN 11357, (2010).
DIN EN ISO 527, (1996).
DIN EN 2564:Aug. 1998, (1998).
DIN EN ISO 1172:Dec. 1998, (1998).
International Search Report for International PCT Patent Application No. PCT/EP2017/081285 dated Mar. 19, 2018.
A.R. Bunsell, J. Renard "Fundamentals of Fibre Reinforced Composite Materials", CRC Press 2005, ISBN 0750306890.

* cited by examiner

*Primary Examiner* — Michael J Feely
(74) *Attorney, Agent, or Firm* — James E. Piotrowski

(57) ABSTRACT

The invention relates to compositions comprising a fiber material and a specific thermoplastic binder. The thermoplastic binder comprises at least one thermoplastic polyurethane polymer, wherein said thermoplastic polyurethane polymer comprises a reaction product of (i) at least one semi-crystalline polyester polyol, and (ii) at least one polyisocyanate. The molar ratio of the NCO groups of said polyisocyanate (ii) to the sum of OH groups of said polyester polyol (i) is less than 1.00:1 and the thermoplastic polyurethane polymer has (a) a melting enthalpy of at least 20 J/g, (b) a melting point ($T_m$) of >70° C., and (c) an average number molecular weight ($M_n$) of 5,000 to 80,000 g/mol. Furthermore, the present invention relates to a fiber-reinforced composite comprising a cured thermosetting polyurethane polymer matrix reinforced by the composition according to the present invention. Moreover, a method for the manufacture of the fiber-reinforced composite according to the present invention and use of the composition or the fiber-reinforced composite in railway vehicles, automotive vehicles, aircraft vehicles, boats, space vehicles, motorbikes, bicycles, sporting goods, helmets, functional clothing, shoes, construction parts in bridges and buildings or wind turbine blades are described.

16 Claims, No Drawings

COMPOSITIONS COMPRISING A FIBER MATERIAL AND A THERMOPLASTIC BINDER

The invention relates to compositions comprising a fiber material and a specific thermoplastic binder. The thermoplastic binder comprises at least one thermoplastic polyurethane polymer (TPU), wherein said thermoplastic polyurethane polymer comprises a reaction product of (i) at least one semi-crystalline polyester polyol, as defined herein, and (ii) at least one polyisocyanate. The molar ratio of the NCO groups of said polyisocyanate (ii) to the sum of OH groups of said polyester polyol (i) is less than 1.00:1. Furthermore, the present invention relates to a fiber-reinforced composite comprising a cured thermosetting polyurethane polymer matrix reinforced by the composition according to the present invention. Moreover, a method for the manufacture of the fiber-reinforced composite according to the present invention and use of the composition or the fiber-reinforced composite in railway vehicles, automotive vehicles, aircraft vehicles, boats, space vehicles, motorbikes, bicycles, sporting goods, helmets, functional clothing, shoes, construction parts in bridges and buildings or wind turbine blades are described.

Fiber-reinforced composites (FRC) contain a fiber material embedded in a cured matrix resin. Usually a binder is applied with the fiber material to hold the fibers together and provide sufficient mechanical support to the fiber material during the manufacturing process of the FRC. Since the finished part shall be persistent to high mechanical stresses, the employed binders should be firmly connected with the fiber material after curing to avoid defects in the fiber-reinforced composite. Imperfections in the binders may have a negative effect on the mechanical properties of the fiber-reinforced composite. For this reason cavities and bubbles should be avoided in the binders when applied to the fiber-material. Binders on the basis of thermosets have several disadvantages. For example, the activation energy of the thermosetting binder is usually very high, which can impair the properties of the fiber material. Thermosets also exhibit a limited storage life at room temperature. Moreover, compositions on the basis of thermosetting binders require due to the curing time a prolonged manufacturing process compared to the use of thermoplastic binders. On the other hand the employment of thermoplastics as binders is difficult due to their high melt or solution viscosity when trying to process them into the fiber material. Furthermore layers of fiber materials treated with thermoplastic binders typically tend to show an undesirable tackiness, which can lead to problems during storage. Since the fiber material after it has been processed with the binder material is typically rolled up to a coil and stored, the binder should preferably be essentially non-tacky otherwise the coil cannot be easily unrolled. Moreover, commercially available thermoplastic polymers such as nylons and polycarbonate are of limited interest in composites for structural applications since they have a low thermal stability and a lower creep resistance compared to thermoset polymers.

Therefore, it is an object of the present invention to provide an improved composition comprising fiber material and a thermoplastic binder, which addresses the aforementioned needs, in particular provides a short manufacturing process, good mechanical properties (high stiffness), reduced tackiness (good rewindability), and good storage characteristics (good reactivation). The international patent application WO 2016/50531 describes compositions comprising a fiber material and a thermoplastic binder, wherein the thermoplastic binder comprises at least one thermoplastic polyurethane polymer, with said thermoplastic polyurethane polymer comprising a reaction product of a polyester polyol and a polyisocyanate that satisfy the above criteria. However, it has been found that the compositions in powder form disclosed therein sometimes lack free-flowing properties and are not pulverizable. In addition, the softening and stiffness properties of the thermoplastic binder are unsatisfactory.

In this regard, it has been surprisingly found by the present inventors that the compositions of the present invention containing a specific thermoplastic binder and a fiber material provide, in addition to improved stiffening characteristics and a reduced tackiness, also good free-flowing properties, good grindability and desirable softening properties.

A thermoplastic binder according to the invention can also be referred to as a hot melt adhesive. It is meltable but it is essentially free of reactive functional groups, such as for example isocyanate groups, which may crosslink after application within the thermoplastic binder. However, the thermoplastic binder may comprise functional groups which can react with the thermosetting matrix resin, such as for example hydroxy groups. The thermoplastic binder contains a thermoplastic polyurethane (TPU) and further optional additives which will be defined in detail below. The thermoplastic binder is preferably essentially non-tacky at room temperature after application.

In the present specification the terms "a" and "an" and "at least one" are the same as the term "one or more" and can be employed interchangeably. "At least one" and "one or more", as used herein, relate to 1, 2, 3, 4, 5, 6, 7, 8, 9 or more of the referenced species. When used in combination with a compound or class of compounds, this term does not refer to the total number of molecules but rather to the number of types of the respective compound or class of compounds.

The term "essentially free" within the context of this invention is to be interpreted as the respective compound is contained in the composition in an amount of less than 5 wt.-%, 4 wt.-%, 3 wt.-%, 2 wt.-%, 1.5 wt.-%, 1 wt.-%, 0.75 wt.-%, 0.5 wt.-%, 0.25 wt.-%, or 0.1 wt.-%, based on the total weight of the composition, wherein the amounts are respectively more preferred in descending order. For example, 4 wt.-% is more preferred than 5 wt.-% and 3 wt.-% is more preferred than 4 wt.-%.

The term "composition" is to be interpreted as "composition comprising a fiber material and a thermoplastic binder" unless explicitly stated otherwise.

The terms "resin" or "matrix resin" is to be interpreted as "two-component polyurethane matrix resin" unless explicitly stated otherwise.

In the present invention the molar ratio of the isocyanate (NCO) groups of the polyisocyanate to the sum of the hydroxyl (OH) groups of the polyester polyol(s) is also referred to as NCO:OH unless explicitly stated otherwise.

In particular, the present invention relates to a composition comprising a fiber material and a thermoplastic binder, wherein the thermoplastic binder comprises at least one thermoplastic polyurethane polymer; wherein said thermoplastic polyurethane polymer comprises a reaction product of (i) at least one semi-crystalline polyester polyol having a melting point ($T_m$) of from 40 to 180° C.; and
(ii) at least one polyisocyanate;
wherein the molar ratio of the NCO groups of said polyisocyanate (ii) to the sum of OH groups of said at least one semi-crystalline polyester polyol (i) is less than 1.00:1; and wherein said thermoplastic polyurethane polymer has (a) a melting enthalpy of at least 20 J/g, preferably 20 to 70 J/g, more preferably 30 to 50 J/g, (b) a melting point ($T_m$) of >70° C., preferably >90° C., more preferably >90 to 180° C., and (c) an average number molecular weight ($M_n$) of 5,000 to 80,000 g/mol, more preferably of 5,000 to 50,000 g/mol, even more preferably of 6,000 to 40,000 g/mol, particularly preferably of 7,000 to 30,000 g/mol, most preferably of 10,000 to 25,000 g/mol.

Furthermore, the invention relates to fiber-reinforced composite comprising a cured thermosetting polyurethane polymer matrix reinforced by the composition according to the present invention, characterized in that fibers are contained in proportions of more than 30% by volume based on the total volume of said fiber-reinforced composite.

Moreover, the invention relates to for the manufacture of fiber-reinforced composites according to the present invention comprising the steps:
1) providing an external mold comprising the composition according to the present invention;
2) introducing the two-component polyurethane matrix resin into said mold under pressure and/or vacuum; and
3) curing said composition at a temperature of up to 140° C., preferably from 60 to 120° C.

In addition to that, the present invention also relates to the use of the composition according to the present invention or the fiber-reinforced composite according to the present invention in railway vehicles, automotive vehicles, aircraft vehicles, boats, space vehicles, motorbikes, bicycles, sporting goods, helmets, functional clothing, shoes, construction parts in bridges and buildings or wind turbine blades.

Further preferred embodiments of the invention are set out in the claims.

The thermoplastic polyurethane polymer according to the present invention has an NCO:OH ratio of less than 1:1. In preferred embodiments the NCO:OH ratio is in a range having any combination of an upper limit selected from less than 0.99:1, 0.975:1, 0.95:1, 0.9:1, 0.85:1, 0.8:1, 0.75:1, 0.7:1, 0.65:1 or 0.6:1 and having a lower limit selected from 0.25:1, 0.30:1, 0.35:1, 0.4:1, 0.45:1. In more preferred embodiments the NCO:OH ratio is in the range 0.45 to 0.75:1. In even more preferred embodiments the NCO:OH ratio is 0.5 to 0.7:1.

The thermoplastic polyurethane polymer according to the invention has (a) a melting enthalpy of at least 20 J/g, preferably 20 to 70 J/g, more preferably 30 to 50 J/g (as determined by DSC as defined below), (b) a melting point ($T_m$) of >70° C., preferably >90° C., more preferably >90 to 180° C. (as determined by DSC as defined below), and (c) an average number molecular weight ($M_n$) of 5,000 to 80,000 g/mol, more preferably of 5,000 to 50,000 g/mol, even more preferably of 6,000 to 40,000 g/mol, particularly preferably of 7,000 to 30,000 g/mol, most preferably of 10,000 to 25,000 g/mol (measured by GPC as defined below).

The melting enthalpy and melting point are, if not indicated otherwise, determined using an analytical-balance capable of measuring to ±0.1 mg and a Mettler Toledo TA Instruments Q20 DSC unit. The DSC is calibrated using an Indium standard. For the actual measurement, 5 to 10 mg of sample is weighed into an aluminum DSC pan and the lid fixed securely. The temperature of the DSC chamber is set at 40° C. prior to use. The sample pan and reference pan (blank) is placed into the DSC cell chamber. The temperature is reduced to 0° C. at a cooling rate of 20° C. per minute. The temperature is held at 0° C. for 20 minutes and then increased to 200° C. at a heating rate of 10° C. per minute.

The Tg is obtained from an inflection in the heat flow whereas $T_m$ is obtained from an endothermic peak in the heat flow. The melting enthalpy is calculated by integration of the endothermic peak in the heat flow with the linear baseline.

It is preferred that the thermoplastic polyurethane polymer has an equivalent weight of 3500 to 15000 g/eq, preferably 6000 to 12000 g/eq (measured by OH number determination according to DGF-CV 17a (98)).

The at least one semi-crystalline polyester polyol has a melting point ($T_m$) of from 40 to 180° C. Further, it has preferably a number average molecular weight ($M_n$, measured by GPC as defined below) of more than 750 g/mol. In more preferred embodiments the $M_n$ is in a range having any combination of a lower limit selected from more than 750, 1,000, 2,000, 3,000, 4,000, 5,000, 6,000, 7,000, 8,000, 9,000 and 9,500 g/mol and an upper limit selected from 10,000, 9,000, 8,000, 7,000, 6,000, 5,000, 4,500, 4,000, 3,500, 3,000, 2,500, 2,000, and 1,000 g/mol. In even more preferred embodiments the range is 1,000 to 7,000 g/mol. In most preferred embodiments the range is 1,000 to 5,000 g/mol. The composition of this polyester polyol can be selected from the acid and diol monomers as listed below, which form a semi-crystalline polyester, respectively. Preferably diol components are used including aliphatic diols, such as 1,4-butane diol and 1,6-hexane diol.

The thermoplastic binder contains in preferred embodiments the polyester polyol according to item (i) from 60 to 997 wt-%, based on the total weight of the at least one thermoplastic polyurethane polymer. In more preferred embodiments the polyester polyol according to item (i) is contained from 70 to 997 wt.-% and in most preferred embodiments from 75 to 97 wt.-%.

Main components for the synthesis of the thermoplastic polyurethane polymers according to the invention are semi-crystalline polyester polyols, as defined above. These include crystalline or semi-crystalline polyester polyols, which in the present invention are referred to as semi-crystalline polyester polyols. These are different from non-crystalline polyester polyols which include liquid polyester polyols and solid amorphous polyester polyols. Polyester polyols are well known to the skilled person and they can be obtained by a reaction of polycarboxylic acids and polyols. Thereby it is possible to include small amounts of three-functional alcohols or carboxylic acids in the reactions in order to incorporate branching without crosslinking. To obtain linear polyester polyols it is preferred that most of the monomers are difunctional components. The properties of the polyester polyols can be adjusted according to the type of comonomers. It is well known to the skilled person how to prepare semi-crystalline polyester polyols. The polyester shall contain at least two hydroxyl groups. The properties of the polyester can be designed by the different components. For example, a single linear aliphatic diol and a linear aliphatic diacid will tend to provide semi-crystalline polymers. Increasing melting point can be obtained by increasing the length of the carbon chain in the diacid or by using symmetrical aromatic diacids. More amorphous materials can be obtained by increasing the number of comonomers or incorporating branched aliphatic comonomers. The polyester polyols can comprise further functional groups like NH or COOH which can also react with the one or more isocyanates. Suitable monomers for the preparation are described below.

The components for the synthesis of the thermoplastic polyurethane polymers are selected in a way, so that preferably linear polyurethanes are obtained. In order to obtain a thermoplastic polyurethane polymers which is essentially free of NCO groups the amount of the NCO groups (equivalents) in the one or more isocyanate is selected to be smaller than the amount (equivalents) of reactive OH, SH, $NH_2$, COOH groups of the polyester polyols.

Suitable polyester for thermoplastic polyurethane polymers shall contain at least two hydroxyl groups. Suitable polyester polyols for thermoplastic polyurethane polymers are formed through the condensation of one or more polyhydric alcohols having preferably from 2 to 30 carbon atoms with one or more polycarboxylic acids having preferably from 2 to 14 carbon atoms. Suitable polyols include alkylene diols, in particular linear alcohols with 2 to 30 C atoms, which exhibit up to four, preferably two OH groups; glycol ethers; and alicyclic polyols. Examples of suitable polyhydric alcohols include ethylene glycol, propylene glycol such as 1,2-propylene glycol and 1,3-propylene glycol, glycerol, pentaerythritol, trimethylolpropane, butanediol, pentanediol, hexanediol, dodecanediol, octanediol, chloropentanediol, glycerol monoallyl ether, glycerol monoethyl ether, diethylene glycol, 2-ethylhexanediol, 1,4-cyclohexanediol, 1,2,6-hexanetriol, 1,3,5-hexanetriol, 1,3-bis-(2-hydroxyethoxy)propane and the like. The polyols can be used separately or in mixture. They preferably have a molecular weight from 100 to 750 g/mol, their functionality is preferably 2 or 3.

Examples of polycarboxylic acids include ortho-phthalic acid, iso-phthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, suberic acid, azelaic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Dimer fatty acids can also be used, where they are the dimerization product of mono- or polyunsaturated acids and/or esters thereof. Preferred dimer fatty acids are dimers of C10 to C30, more preferably C14 to C22 carbon acids. Suitable dimer fatty acids include the dimerization products of oleic acid, linoleic acid, linolenic acid, palmitoleic acid and elaidic acid. The dimerization products of the unsaturated fatty acid mixtures obtained in the hydrolysis of natural fats and oils, e.g., sunflower oil, soybean oil, olive oil, rapeseed oil, cottonseed oil and tall oil may also be used. In addition to the dimer fatty acids, dimerization usually results in varying amounts of oligomeric fatty acids and residues of monomeric fatty acids. Suitable dimer fatty acids have a dimer acid content greater than 75 wt.-% based on the total weight of the dimer fatty acid starting material.

Further suitable polyester polyols for thermoplastic polyurethane polymers are polycarbonate polyols. Polycarbonate polyols can be received for example by the reaction from diols, like propylene glycol, butanediol-1,4 or hexanediol-1,6, diethyleneglycol, triethyleneglycol or tetraethylene glycol or mixtures from two or more from it with diarylcarbonates, as for example diphenyl carbonate, or phosgene. Polyesters on the basis of ε-caprolactone are also suitable. Also polyester polyols are suitable, which contain one or more urethane groups in the polymer chain.

Other useful polyester polyols for thermoplastic polyurethane polymers include, e.g., polyols derived from oleochemicals, and the complete ring opening of epoxidized triglycerides of an at least partially olefinic unsaturated fatty acid-containing fat mixture and at least one alcohol containing from 1 carbon atom to 12 carbon atoms, followed by partial transesterification of the triglyceride derivatives to form alkyl ester polyols having from 1 carbon atom to 12 carbon atoms in the alkyl chain.

For this invention it shall be understood, that the term polyester polyol shall include also polyester, which comprise at the end of the polymer chain amino groups or carboxylic groups. But the preferred end group of such polyester are hydroxyl groups, i.e. a preferred polyester polyol is a polyester diol with two hydroxyl groups at the end of the polymer chain.

Preferred polycarboxylic acids are the aliphatic and cycloaliphatic dicarboxylic acids containing no more than 14 carbon atoms and the aromatic dicarboxylic acids containing no more than 14 atoms.

In various preferred embodiments, the thermoplastic polyurethane polymer is essentially free of non-crystalline polyester polyols. In further preferred embodiments, the thermoplastic polyurethane polymer is also essentially free of diols different from the semi-crystalline polyester polyol (i).

In some preferred embodiments, the thermoplastic polyurethane polymer does not comprises a reaction product of
(i) at least one polyester polyol;
(ii) at least one polyisocyanate; and
(iii) optionally at least one diol which is different from the at least one polyester polyol (i); wherein the molar ratio of the NCO groups of said polyisocyanate (ii) to the sum of OH groups of said polyester polyol (i) and said optionally containing diol (iii) is less than 1.00:1; and
wherein said polyester polyol (i) comprises
(a) at least one semi-crystalline polyester polyol having a melting point ($T_m$) of from 40 to 180° C.; and
(b) at least one non-crystalline polyester polyol.

As suitable monomeric isocyanates to be used in the synthesis of thermoplastic polyurethane polymers preferably isocyanates which contain two or three NCO groups are selected. They include well-known aliphatic, cyclo-aliphatic or aromatic monomeric diisocyanates. Preferably isocyanates are selected with a molecular weight from 160 g/mol to 500 g/mol, for example aromatic polyisocyanates as the isomers of diphenylmethanediisocyanate (MDI), such as 4,4'-diphenylmethanediisocyanate (4,4'-MDI), 2,2'-diphenylmethane diisocyanate (2,2'-MDI), 2,4'-diphenylmethanediisocyanate (2,4'-MDI); the isomers of phenylenediisocyanate, such as 1,3-phenylenediisocyanate, 1,4-phenylenediisocyanate; naphthalene-1,5-diisocyanate (NDI), the isomers of toluenediisocyanate (TDI), such as 2,4-TDI and 2,6-TDI; m- and p-tetramethyl xylylene diisocyanate (TMXDI), m- and p-xylylenediisocyanate (XDI), 3,3'-dimethyldiphenyl-4,4'-diisocyanate (TODI), toluene diisocyanate, naphthalene, di- and tetraalkyl diphenylmethane diisocyanate, 4,4'-dibenzyl diisocyanate, and combinations thereof.

Aliphatic and cyclo-aliphatic isocyanates such as ethylene diisocyanate, dodecane diisocyanate, dimer fatty acid diisocyanate, 4,4'-dibenzyldiisocyanate, 1,6-diisocyanato-2,2,4-trimethylhexane, butane-1,4-diisocyanate, hexane-1,6-diisocyanate (HDI), tetramethoxybutane-1,4-diisocyanate, 1,12-diisocyanato-dodecane, 4,4'-dicyclohexylmethanediisocyanate, 1,3-cyclohexane or 1,4-cyclohexane diisocyanate, 1-methyl-2,4-diisocyanatocyclohexane, 1-isocyanatomethyl-3-isocyanato-1,5,5-trimethylcyclohexane (isophorone diisocyanate, IPDI), hydrogenated or partly hydrogenated MDI ([H]12MDI (hydrogenated) or [H]6MDI (partly hydrogenated), and combinations thereof can also be used.

Preferably, diisocyanates with two NCO groups are selected from the group of the aromatic, aliphatic or cycloaliphatic diisocyanates. It is also possible to include at least partly oligomeric diisocyanates such as allophanate, carbodiimide, isocyanurate, biuret condensation products from diisocyanates, e.g., from HDI, MDI, IPDI or other isocyanates. Polymeric MDI can also be employed. Mixtures of aliphatic or aromatic isocyanates can be used. More preferably aromatic diisocyanates are used.

The thermoplastic binder contains in preferred embodiments the isocyanate from 3 to 40 wt.-%, based on the total weight of the thermoplastic polyurethane polymer. In more preferred embodiments isocyanate is contained from 3 to 30 wt.-% and in most preferred embodiments from 3 to 25 wt.-%.

The manufacture of the thermoplastic polyurethane polymers is well known in the art and can be performed in any reaction vessel which can be heated. In a typical process the polyol components are mixed together as a melt with the resulting composition is optionally dried and a vacuum is optionally applied until the moisture content is below 250 ppm. Subsequently the isocyanates are added to the polyol mixture and this mixture is reacted. The person skilled in the art knows how to determine the temperature and time to complete the reaction. The thermoplastic polyurethane polymer can be made in solvents but this is not preferred because the solvent needs to be removed before using the thermoplastic polyurethane polymers as a thermoplastic binder.

The manufacture of the binder composition can be performed as known in the art. The thermoplastic polyurethane polymers according to the invention are manufactured and thereafter are blended with the different components and additives. This can be done in any known device, e.g., batch reactor, extruder, mixer, kneader or similar machines. It is also possible for some ingredients to be added to the polyester polyol before reaction with the isocyanate, provided that functional materials on the additives do not interfere with the reaction between polyol and isocyanate.

The thermoplastic binder may contain other additives which are known in the art. The term "additive" includes dyes, fillers (e.g., silicates, talcum, calcium carbonates, clays or carbon black), thixotropic agents (e.g., bentones, pyrogenic silicic acids, urea derivatives, fibrillated or pulp short fibers), color pastes and/or pigments, conductivity additives (e.g., conductivity carbon blacks or lithium perchlorate), plasticizers, other thermoplastic polymers, which are different from the thermoplastic polyurethane polymers according to the invention, stabilizers, adhesion promoters, rheological additives, waxes and any combination thereof.

The thermoplastic binder according to the present invention preferably comprises 0.1 to 50 wt.-% of additives, based on the total weight of the thermoplastic binder. In more preferred embodiments 5 to 40 wt.-%, most preferably 10 to 25 wt.-% are contained.

The thermoplastic binder according to the invention may contain other thermoplastic polymers, which are different from the thermoplastic polyurethane polymers according to the present invention. These include but are not limited to EVA, rubber type polymers, styrene copolymers, polyester copolymers, polycarbonates, polyamides, acrylics and thermoplastic polyurethanes.

The thermoplastic binder according to the present invention may comprise 0.1 to 50 wt.-% of at least one other thermoplastic polymer, which is different from the thermoplastic polyurethane polymers according to the present invention, based on the total weight of the thermoplastic binder. In various embodiments 5 to 40 wt.-%, preferably 10 to 25 wt.-%, are contained.

The thermoplastic binder according to the present invention may comprise 0.1 to 50 wt.-% of at least one filler, based on the total weight of the thermoplastic binder. In more preferred embodiments 5 to 40 wt.-%, most preferably 10 to 25 wt.-%, are contained.

The thermoplastic binder according to the invention may contain plasticizers, provided that these plasticizers do not interfere with the adhesive capability of the binders—such as phthalates, benzoates, sucrose esters and sulphonamides. By way of example there may be mentioned the liquid phthalate plasticizers, plasticizers based on aromatic esters, such as, e.g., esters of benzoic acid, or also solid plasticizers such as dicyclohexyl phthalate, cyclohexane dimethanol dibenzoate and the like. Also suitable are other plasticizers such as sucrose acetate isobutyrate, ortho-/para-toluene sulphonamide or N-ethyl-ortho-toluene sulphonamide.

The thermoplastic binder according to the present invention may comprise 0.1 to 50 wt.-% of plasticizers, based on the total weight of the thermoplastic binder. In more preferred embodiments 5 to 40 wt.-%, most preferably 10 to 25 wt.-% are contained.

As stabilizers, different components can be used such as antioxidants, UV stabilizers, and hydrolysis stabilizers. Examples for these components are sterically hindered phenols of high molecular weight, sulphur-containing and phosphorus-containing phenols or amines. This include sterically hindered phenols, polyfunctional phenols, thioether, substituted benzotriazoles, hindered benzophenone and/or sterically hindered amines of the "HALS" (Hindered Amine Light Stabilizer) type. Examples of hydrolysis stabilizers include oligomeric and/or polymeric aliphatic or aromatic carbodiimides. Such components are commercially available and known to the skilled person.

The thermoplastic binder according to the present invention may comprise 0.1 to 10 wt.-% of stabilizer, based on the total weight of the thermoplastic binder. In more preferred embodiments 0.2 to 5 wt.-%, most preferably 0.5 to 3 wt.-% are contained.

As adhesion promoters, preferably organofunctional silanes can be used, either in monomeric, oligomeric or polymeric form. The thermoplastic binder according to the present invention may comprise 0.1 to 10 wt.-% of adhesion promoter, based on the total weight of the thermoplastic binder. In more preferred embodiments 0.2 to 5 wt.-%, most preferably 0.5 to 3 wt.-% are contained.

The thermoplastic binder according to the present invention has preferably a viscosity of 1,000 to 100,000 mPa·s at 160° C. In preferred embodiments, the viscosity is in a range having any combination of a lower limit selected from 1,000, 2,000, 3,000, 4,000, 5,000, 7,500, 10,000, 15,000, 20,000, 25,000, 30,000, 35,000, 40,000, 45,000, 50,000, and 70,000 mPa·s and an upper limit selected from 100,000, 90,000, 80,000, 70,000, 60,000, 50,000, 45,000, 40,000, 35,000, 30,000, 25,000, and 20,000 mPa·s. In more preferred embodiments the viscosity is between 2,000 and 70,000 mPa·s. In most preferred embodiments the viscosity is between 3,000 and 50,000 mPa·s.

The compositions of the present invention preferably comprise 0.1 to 40 wt.-% of the thermoplastic binder; and 60 to 99.9 wt.-% of the fiber material based on the total weight of the composition.

In the composition according to the present invention, the fiber material contains preferably fibers selected from glass fibers, synthetic fibers, carbon fibers, boron fibers, ceramic fibers, metal fibers, natural fibers and combinations thereof, most preferably glass fibers, carbon fibers and combinations thereof. Specific examples of the respective category of fibers are disclosed in A. R. Bunsell, J. Renard "Fundamentals of Fibre Reinforced Composite Materials", CRC Press 2005, ISBN 0750306890. Examples for synthetic fibers include polyester fibers, polyethylene fibers, polypropylene fibers, polyamide fibers, like polyamide 6 or polyamide 6.6, polyimine fibers, poly (methyl methacrylate) and aramid fibers. Ceramic fibers include oxide and non-oxide ceramic fibers like aluminum oxide/silicon dioxide fibers, basalt fibers and carbon silicide fibers. Examples of metal fibers are steel, stainless steel or aluminum fibers. Examples of natural fibers are wood fibers, sisal fibers, flax fibers, hemp fibers, coconut fibers, banana fibers and jute fibers.

The fiber material can preferably be in the form of a mat, like a continuous fiber mat or a chopped strand mat, woven fabric, nonwoven fabric, non-crimped fabric, knitted fabric, plies, or roving.

In preferred embodiments of the composition, two or more of the forms of the fiber material can be employed. These forms can comprise one or more of the above described fibers, respectively.

The length of the fibers can be 0.1 to 1 mm, 1 to 50 mm or above 50 mm. In preferred embodiments the fiber length is above 50 mm, more preferably above 500 mm, most preferably the fiber is "endless", i.e. the fiber is a continuous fiber. Endless fibers or continuous fibers are employed in continuous fiber mats for the manufacture of endless fiber reinforced composites, in particular endless fiber reinforced plastics. "Continuous" or "endless" means that the fibers reach from one end of the fiber mat to another, such that the fiber ends are located at the outer edges of the fiber mat and not inside the fiber mat. This improves the mechanical properties of the fiber reinforced composites.

In a preferred embodiment glass or carbon fibers having a length of above 500 mm are employed, more preferably these fibers are in the form of mats, nonwoven fabric and non-crimped fabric or combinations thereof.

The present invention also relates to a composite, which comprises a cured thermosetting polyurethane polymer matrix reinforced by the composition according to the present invention, wherein the cured thermosetting polyurethane polymer matrix is a thermoset, preferably according to DIN 7708-1:1980-12. In preferred embodiments the fibers are contained in proportions of more than 30 vol.-%, based on the total volume of said fiber-reinforced composite. In more preferred embodiments the fibers are contained in 30 to 65 vol.-%, most preferred in 40 to 55 vol.-%, based on the total volume of said fiber-reinforced composite.

The fiber weight fraction can be experimentally determined, for example by the ignition loss method (ASTM D2854) or the matrix digestion method (ASTM D3171). The vol.-% of carbon fibers can preferably be measured according to DIN EN 2564:1998-08 in case of glass fibers preferably DIN EN ISO 1172:1998-12 can be employed. For unidirectional composites containing electrically conductive fibers (such as carbon) in a non-conductive matrix, the fiber volume fraction can be determined directly by comparing the electrical resistivity of the composite with that of fibers (ASTM D3355).

The cured thermosetting polyurethane polymer matrix for the fiber-reinforced composite is obtainable by the reaction of a two-component polyurethane matrix resin comprising at least one polyol (I) having a number average molecular weight (Ma) of less than 3000 g/mol;
at least one polyisocyanate (II);

wherein the molar ratio of the OH groups of said polyol (I) to the NCO groups of said polyisocyanate (II) is from 2:1 to 1:10, preferably from 2:1 to 1:5, most preferably from 2:1 to 1:2.

The at least one polyol (I) contains two or more hydroxyl groups per molecule. In preferred embodiments the number of hydroxyl groups per molecule is in a range having any combination of a lower limit selected from 2, 3 and an upper limit of 8, 7, 6, 5. In more preferred embodiments the number of hydroxyl groups per molecule is from 2 to 8, in most preferred embodiments from 3 to 5.

It is preferred that the hydroxyl groups of the least one polyol (I) are selected from primary and/or secondary hydroxyl groups. Furthermore it is preferred, that the hydroxyl groups of the least one polyol (I) are connected to aliphatic carbon atoms.

The at least one polyol (I) has a number average molecular weight ($M_n$) of less than 3000 g/mol. In preferred embodiments the number average molecular weight ($M_n$) is in a range having any combination of a lower limit selected from more than 100, 150, 200 and an upper limit of 2500, 2000, 1500 g/mol. In more preferred embodiments the number average molecular weight ($M_n$) is form 100 to 2500 g/mol, and in most preferred embodiments from 200 to 1500 g/mol.

In a preferred embodiment the at least one polyol (I) has a viscosity of less than 5000 mPa·s, preferably 1000-4000 mPa·s (DIN ISO 2555, Brookfield RVT, spindle No. 4, 25° C.; 20 rpm).

As polyols (I) polyester polyols can be used. It is also possible to use polycarbonate polyols as polyols (I). Suitable polyester polyols and polycarbonate polyols can be selected from the aforementioned polyester polyols and polycarbonate polyols employed for the synthesis of thermoplastic polyurethane polymers.

It is also possible to use polyhydric alcohols having 2 to 30 carbon atoms as polyols (I) selected from the aforementioned polyhydric alcohols which are used in the synthesis of the polyesters for thermoplastic polyurethane polymers as mentioned above.

In a preferred embodiment polyether polyols are used as polyols (I). Polyether polyols containing 2, 3 or 4 hydroxyl groups are preferred. The polyether polyols are preferably obtained by reacting polyhydric alcohols or water with alkylene oxides. The polyhydric alcohols preferably contain 2, 3 or 4 hydroxyl groups. Examples for suitable polyhydric alcohols for the synthesis of polyether polyols can be selected from the aforementioned diols (iii) as employed for the synthesis of the thermoplastic polyurethane polymers, glycerol, hexanetriol, trimethylolpropane, pentaerythritol, sugar alcohols, resorcinol, hydroquinone, 1,2,2- or 1,1,2-tris-(hydroxyphenyl)ethane, and mixtures thereof. Examples of suitable alkylene oxides are ethylene oxide, propylene oxide, butylene oxide, tetrahydrofuran or mixtures thereof. Polyoxyethylene polyols or polyoxypropylene polyols with 2 or 3 hydroxyl groups are preferred. The polyether polyols have a number average molecular weight ($M_n$) preferably in a range from 170 to 3000 g/mol, more preferably from 170 to 1000 g/mol, most preferably from 170 to 350 g/mol.

As the at least one polyisocyanate (II) isocyanates with at least two isocyanate groups are used. The isocyanates preferably contain 2 to 5, more preferably from 2 to 4 NCO groups. They include the well-known aliphatic, cyclo-aliphatic or preferably aromatic monomeric diisocyanates. Preferred polyisocyanates can be selected from the polyisocyanates as used in the synthesis for thermoplastic polyurethane polymers as mentioned above.

Proportions of low molecular weight prepolymers, preferably with a number average molecular weight ($M_n$) of less than 2000 g/mol, may also be used as polyisocyanates (II), for example reaction products of MDI or TDI with polyhydric alcohols selected from the aforementioned group of polyhydric alcohols having 2 to 30 carbon atoms which can be used as polyol (I), such as for instance ethylene glycol, diethylene glycol, propylene glycol, dipropylene glycol or triethylene glycol. These low molecular weight prepolymers may be produced by reacting an equivalent excess of monomeric polyisocyanate in the presence of polyhydric alcohols, preferably diols. The number average molecular weight ($M_n$) of the diols is preferably below 1000 g/mol. Residual monomeric isocyanates may optionally be removed from the reaction product by distillation.

In one embodiment of the invention aromatic diisocyanates are preferred as polyisocyanates (II), while in another embodiment mixtures of aliphatic and/or cyclo-aliphatic with aromatic isocyanates are preferably used. It is preferred, that at least 50 mol % of the NCO groups of the at least one polyisocyanate (II) originate from the isomers of MDI.

The viscosity of the at least one polyisocyanate (II) is preferably less than 80 mPa·s, particularly preferably from 30 to 60 mPa·s (DIN ISO 2555, Brookfield RVT, spindle No. 3, 25° C.; 50 rpm).

The two-component polyurethane matrix resin may comprise from 0 to 10 wt.-% of at least one auxiliary substance based on the total weight of the two-component polyurethane matrix resin. The at least one auxiliary substances is preferably admixed wholly or partially with the at least one polyol (I). The auxiliary substances can be added in order to modify the properties of the composition, such as for example viscosity, wetting behavior, stability, reaction kinetics, avoidance of bubble formation, storage life or adhesion. Examples of auxiliary substances are leveling agents, wetting agents, catalysts, desiccants and the aforementioned additives for use in the thermoplastic binder.

As catalysts the two-component polyurethane matrix resin can comprise metal organic compounds based on iron, titanium, zirconium, aluminum, lead, tin and preferably bismuth.

Another group of catalysts which can be used in the two-component polyurethane matrix resin are those based on tertiary amines. As an example, linear or preferably cyclic aliphatic amines can be employed, such as methylcyclohexylamine, dimethylbenzylamine, tributylamine, monoethanolamine, triethanolamine, diethylenetriamine, triethylenetetramine, triethylenediamine, guanidine, morpholine, N-methylmorpholine, diazabicyclooctane (DABCO), 1,8-diazabicyclo-(5,4,0)-undecene-7 (DBU) or diazabicyclononene (DBN).

In preferred embodiment the catalyst is contained in a quantity of 0.01 to 5 wt.-% based on the total weight of the two-component polyurethane matrix resin.

Preferably, no pigments, molecular sieves, fillers and/or plasticizers are present in the two-component polyurethane matrix resin. Furthermore, the two-component polyurethane matrix resin preferably contains no organic solvents. In various embodiments, the two-component polyurethane matrix resin may comprise nanoparticles to improve toughness and/or other properties of the resin.

In a preferred embodiment the two-component polyurethane matrix resin contains 30 to 70 wt.-% of polyols with a functionality of greater than 2, preferably greater than 3, in particular polyether polyols and polyester polyols, 70 to 30 wt.-% of polyisocyanates, wherein in particular at least 50 mol % of all isocyanate groups originate from isomers of MDI, 0.1 to 5 wt.-% of additives, the sum of components being intended to amount to 100%.

In a preferred embodiment the cured thermosetting two-component polyurethane matrix preferably has a glass transition temperature (Tg) of above 60° C. (measured by DSC, DIN 11357), more preferably from 100 to 140° C. and a modulus of elasticity of more than 1000 MPa at temperatures of between −10° C. and +70° C. (in line with DIN EN ISO 527).

The present invention also provides a method for the manufacture of fiber-reinforced composites comprising the steps:
1) providing an external mold comprising the composition, which comprises the fiber material and the thermoplastic binder (preform);
2) introducing the two-component polyurethane matrix resin into said mold under pressure and/or vacuum; and
3) curing said composition at a temperature of up to 140° C., preferably from 60 to 130° C.

The method for manufacture of fiber-reinforced composites comprises injection and infusion methods or combinations thereof. In particular, the method according to the invention comprises two embodiments. Inflow may be carried out rapidly by injection under pressure (Resin Transfer Molding or also RTM method), optionally also with vacuum assistance (VARTM). The preferred two-component polyurethane matrix resins employed in the RTM method have a short open time, but thereafter exhibit a rapid reaction. In another embodiment the mold is filled by application of a vacuum (infusion method). In this embodiment, a long open time is advantageous. Preferably, the viscosity of the two-component polyurethane matrix resin is low and may increase only slightly under the method conditions of mold filling. Care must be taken to ensure that the flow rate is selected such that air or gases can escape from between the fiber materials.

In case of the infusion method, a long open time is preferred, for which reason the two-component polyurethane matrix resin should preferably contain no catalysts. Alternatively, retarded or temperature activated catalysts can be used. Inflow onto the fiber materials, displacement of air bubbles and mold filling may be carried out over an extended period. Due to the slow progress of the reaction, the fiber materials can be completely embedded in the matrix material.

In case of the RTM method, mold filling proceeds in a short time. The two-component polyurethane matrix resin is introduced into the mold under pressure. The low initial viscosity ensures that the fibers are rapidly embedded. In this embodiment, the compositions preferably also contain catalysts. After a short time, the latter accelerate the reaction and curing therefore proceeds rapidly. This may also be assisted by an elevated temperature. A short residence time in the mold is then possible.

Since a crosslinking reaction begins after mixing, it is convenient either for only the required quantities of the two-component polyurethane matrix resin mixture to be produced and directly processed or, in another approach, the two-component polyurethane matrix resin is produced continuously and introduced into the mold.

Once the mold has been filled, the two-component polyurethane matrix resin begins to cure. This may proceed without additional heat. The heat of reaction arising from the crosslinking reaction does not result in localized overheating of the substrates. The filled mold may be heated in order to accelerate the crosslinking reaction. It may be heated to temperatures of up to 140° C., preferably 60 to 130° C., so ensuring faster crosslinking of the two-component polyurethane matrix resin. The molded part can thus be removed sooner from the mold and is then available for further working operations.

The composition comprising a fiber material and a thermoplastic binder according to the invention are particularly suitable to be embedded by the two-component polyurethane matrix resin, for example by means of the infusion method or the RTM method. Acceleration of curing may be achieved by targeted temperature control of the method and not necessarily by the choice of the two-component polyurethane matrix resin. Due the composition of the invention, a fiber-reinforced composite can be produced, which shows less defects and an improved mechanical strength.

The composition according to the present invention and the fiber-reinforced composite according to the present invention can be used in railway vehicles, automotive vehicles, aircraft vehicles, boats, space vehicles, motorbikes, bicycles, sporting goods, e.g., skis, snowboards, rackets, golf clubs, fishing rods, baseball bats, hockey sticks, arrows, archery bows, surfboards, javelins, exercise equipment, helmets, functional clothing, shoes, construction parts in bridges and buildings or wind turbine blades.

EXAMPLES

Methods

The following measurement methods are employed in the present invention if not explicitly stated otherwise.

Melting Point and Tg

The melting enthalpy, Tg and melting point are, if not indicated otherwise, determined using an analytical-balance capable of measuring to ±0.1 mg and a Mettler Toledo TA Instruments Q20 DSC unit. The DSC is calibrated using an Indium standard. For the actual measurement, 5 to 10 mg of sample is weighed into an aluminum DSC pan and the lid fixed securely. The temperature of the DSC chamber is set at 40° C. prior to use. The sample pan and reference pan (blank) is placed into the DSC cell chamber. The temperature is reduced to 0° C. at a cooling rate of 20° C. per minute. The temperature is held at 0° C. for 20 minutes and then increased to 200° C. at a heating rate of 10° C. per minute. The Tg is obtained from an inflection in the heat flow whereas Tm is obtained from an endothermic peak in the heat flow. The melting enthalpy is calculated by integration of the endothermic peak in the heat flow with the linear baseline.

Molecular Weight

The respective compounds/compositions are analyzed for molecular weight and molar mass distribution by Gel Permeation Chromatography (GPC) under the same chromatographic condition. Test samples are dissolved in N,N-dimethylacetamide and each of the prepared sample solutions is filtered through a 0.20 µm syringe filter into analysis vial. The prepared sample solutions is analyzed by liquid chromatography using a GPC separation technique using Styragel columns with N,N-dimethylacetamide/LiCl elution and refractive index detection at 80° C. The number average molecular weight ($M_n$) and weight average molecular weight ($M_w$) that is determined for the tested substances is based on an external calibration that is carried out with polystyrene standards.

Equivalent Weight

The equivalent weight is determined by OH number determination according to DGF-CV 17a (98).

Melt Viscosity

Melt viscosity was measured using a Brookfield Viscometer model RVDV-1+ with a Model 106 temperature controller and Thermosel unit, calibrated with viscosity standard oil. 10 to 12 g of adhesive is weighed into a disposable aluminum viscometer tube. The tube is inserted into the Viscometer and left to equilibrate for 30 minutes at 160° C. The preheated spindle no. 27 is inserted into the adhesive and allowed to rotate for 30 minutes at 160° C.; the speed of rotation is changed according to the viscosity range measured. The initial viscosity V1 at 160° C. is then measured.

Example 1: Preparation of the Thermoplastic Binder Compositions

The polyester polyol was weighed into a glass flask and heated to 120° C. with mechanical stirring. The flask was sealed and vacuum was applied for 1 hour (pressure 2-5 mbar) via a vacuum pump to remove water. Flake MDI was added and allowed to react with the hydroxyl groups at 130° C. The reaction was followed by infra-red spectroscopy until the NCO absorption at 2200 cm$^{-1}$ disappeared.

TABLE 1

| | Thermoplastic binder compositions | | | |
|---|---|---|---|---|
| | E1 | E2 | E3 | V1 |
| Semicryst. polyester polyol 1 | 300 g/0.1508 eq | 250 g/0.1257 eq | 150 g/0.0775 eq | — |
| Semicryst. polyester polyol 2 | — | — | 87.88 g/0.0517 eq | 207.73 g/0.1222 eq |
| Amorph. polyester polyol | — | — | — | 42.84 g/0.0305 eq |
| 4,4'-MDI | 9.43 g/0.0754 eq | 10.47 g/0.0838 eq | 12.12 g/0.0969 eq | 12.73 g/0.1018 eq |
| Melting enthalpy (J/g) | 33 | 30 | 22 | 10 |
| Melting point (° C.) | 93 | 94 | 115 | 120 |
| Equivalent weight (g/eq) | 4000 | 7013 | 9840 | 7100 |

TABLE 1-continued

| Thermoplastic binder compositions | | | | |
|---|---|---|---|---|
| | E1 | E2 | E3 | V1 |
| Number average molecular weight $M_n$ (g/mol) | 8000 | 14026 | 19680 | 14200 |
| Cryo-milling | OK | OK | OK | OK |
| Caking | no caking | no caking | no caking | caking |

E1-E3: According to the Invention

V1: Comparative Example

Semi-crystalline polyester 1: Dynacoll 7340 (Evonik Industries), OH number 28-29, equivalent weight 1934-1989 g/eq
Semi-crystalline polyester 2: Dynacoll 7321 (Evonik Industries); OH number 33, equivalent weight 1700 g/eq
Amorphous polyester: Dynacoll 7150 (Evonik Industries); OH number 40, equivalent weight 1402.5 g/eq
4,4'-MDI: 4,4'diphenyl methane diisocyanate (Desmodur 44MC, Covestro)

The invention claimed is:

1. A composition comprising a fiber material and a thermoplastic binder,
    wherein the thermoplastic binder comprises at least one thermoplastic polyurethane polymer that is a reaction product of:
        (i) at least one semi-crystalline polyester polyol having a melting point ($T_m$) of from 40 to 180° C.; and
        (ii) at least one polyisocyanate;
    wherein the molar ratio of the NCO groups of said polyisocyanate (ii) to the sum of OH groups of said at least one semi-crystalline polyester polyol (i) is less than 1.00:1; and
    the thermoplastic polyurethane polymer has (a) a melting enthalpy of at least 20 J/g, (b) a melting point ($T_m$) of >70° C., and (c) an average number molecular weight ($M_n$) of 5,000 to 80,000 g/mol.

2. The composition according to claim 1, wherein said thermoplastic polyurethane polymer has an equivalent weight of 3500 to 15000 g/eq.

3. The composition according to claim 1, wherein the thermoplastic binder comprises 50 to 99.9 wt.-% of the at least one thermoplastic polyurethane; and 0.1 to 50 wt.-% of additives, based on the total weight of the said thermoplastic binder.

4. The composition according to claim 1, wherein the thermoplastic binder comprises 0.1 to 50 wt.-% of additives, based on the total weight of the said thermoplastic binder, and is selected from stabilizer, adhesion promoter, filler, plasticizer, further thermoplastic polymers which are different from the at least on thermoplastic polyurethane copolymer, or a combination thereof.

5. The composition according to claim 1, comprising
    0.1 to 40 wt.-% of the thermoplastic binder; and
    60 to 99.9 wt.-% of the fiber material, based on the total weight of said composition.

6. The composition according to claim 1, wherein the fiber material contains fibers selected from glass fibers, synthetic fibers, carbon fibers, boron fibers, ceramic fibers, metal fibers, natural fibers and combinations thereof.

7. The composition according to claim 1, wherein the fiber material is in the form of a mat, woven fabric, nonwoven fabric, non-crimped fabric, knitted fabric, plies, or roving.

8. The composition according to claim 1, wherein the at least one polyester polyol contains at least two hydroxyl groups.

9. The composition according to claim 1, wherein the at least one polyester polyol is formed through a condensation reaction of one or more polyhydric alcohols having from 2 to 30 carbon atoms with one or more polycarboxylic acids having 2 to 14 carbon atoms.

10. The composition according to claim 1, wherein the at least one polyisocyanate has a molecular weight from 160 g/mol to 500 g/mol.

11. The composition according to claim 1, wherein the at least one polyisocyanate is selected from the group consisting of the isomers of diphenymethanediisocyanate (MDI), the isomers of phenylenediisocyanate, naphthalene-1,5-diisocyanate (NDI), the isomers of toluenediisocyanate (TDI), m- and p-tetramethyl xylylene diisocyanate (TMXDI), m- and p-xylylenediisocyanate (XDI), 3,3'-dimethyldiphenyl-4,4'-diisocyanate (TODD, toluene diisocyanate, di- and tetraalkyl diphenylmethane diisocyanate, 4,4'-dibenzyl diisocyanate and combinations thereof.

12. The composition according to claim 1, wherein the at least one polyisocyanate is selected from the group consisting of ethylene diisocyanate, dodecane diisocyanate, dimer fatty acid diisocyanate, 4,4'-dibenzyldiisocyanate, 1,6-diisocyanato-2,2,4-trimethylhexane, butane-1,4-diisocyanate, hexane-1,6-diisocyanate (HDI), tetramethoxybutane-1,4-diisocyanate, 1,12-diisocyanato-dodecane, 4,4'-dicyclohexylmethanediisocyanate, 1,3-cyclohexane or 1,4-cyclohexane diisocyanate, 1-methyl-2,4-d iisocyanato-cyclohexane, 1-isocyanatomethyl-3-isocyanato-1,5,5-trimethylcyclohexane (isophorone diisocyanate, IPDI), hydrogenated or partly hydrogenated MDI ([H]12MDI (hydrogenated) or [H]6MDI (partly hydrogenated), and combinations thereof.

13. A fiber-reinforced composite comprising a cured thermosetting polyurethane polymer matrix reinforced by cured reaction products of the composition according to claim 1, wherein the fiber material comprises more than 30% by volume of the fiber-reinforced composite based on the total volume of the fiber-reinforced composite.

14. The fiber-reinforced composite according to claim 13, wherein the cured thermosetting polyurethane polymer matrix is a reaction product of a two-component polyurethane matrix resin comprising:
    at least one polyol (I) having a number average molecular weight ($M_n$) of less than 3,000 g/mol; and
    at least one polyisocyanate (II);

wherein the molar ratio of the OH groups of said polyol (I) to the NCO groups of said polyisocyanate (II) is from 2:1 to 1:2.

15. A method for the manufacture of fiber-reinforced composites according to claim 13, comprising:
providing an external mold;
providing the composition according to claim 1;
disposing the composition according to claim 1 into the mold;
introducing the uncured thermosetting polyurethane polymer matrix into said mold under pressure and/or vacuum; and
curing said composition at a temperature of up to 140° C.

16. A railway vehicle, automotive vehicle, aircraft vehicle, boat, space vehicle, motorbike, bicycle, sporting good, helmet, functional clothing, shoe, construction part in a bridges, construction part in a building or wind turbine blade comprising the composition according to claim 1 or the fiber-reinforced composite according to claim 13.

* * * * *

UNITED STATES PATENT AND TRADEMARK OFFICE
CERTIFICATE OF CORRECTION

PATENT NO. : 10,519,287 B2
APPLICATION NO. : 16/441177
DATED : December 31, 2019
INVENTOR(S) : Andreas Niegemeier et al.

It is certified that error appears in the above-identified patent and that said Letters Patent is hereby corrected as shown below:

In the Specification

Column 9, Line 66: Change "(Ma)" to -- (Mn) --.

In the Claims

Column 16, Line 37: Change "(TODD" to -- (TODI) --.

Column 16, Line 48: Change "1-methyl-2,4-d iisocyanatocyclohexane" to
-- 1-methyl-2,4-diisocyanatocyclohexane --.

Signed and Sealed this
Eighth Day of September, 2020

Andrei Iancu
*Director of the United States Patent and Trademark Office*